United States Patent [19]

Bernacchi et al.

[11] Patent Number: 5,188,855
[45] Date of Patent: Feb. 23, 1993

[54] PROCESS FOR MAKING COATED EXPANDED SNACK PRODUCT

[75] Inventors: Donald B. Bernacchi, Chicago; Donna L. Immel, Green Oaks, both of Ill.; Carol A. Yuknis, Highland, Ind.

[73] Assignee: Griffith Laboratories Worldwide, Inc., Alsip, Ill.

[21] Appl. No.: 563,482

[22] Filed: Aug. 7, 1990

Related U.S. Application Data

[63] Continuation of Ser. No. 308,146, Feb. 8, 1989, abandoned.

[51] Int. Cl.⁵ .......................... A23L 1/10; A23L 1/216
[52] U.S. Cl. .................................... 426/273; 426/293; 426/296; 426/438; 426/808
[58] Field of Search ...................... 426/89, 93, 96, 273, 426/293, 296, 550, 559, 560, 439, 440, 496, 808, 438

[56] References Cited

U.S. PATENT DOCUMENTS

| | | | |
|---|---|---|---|
| 3,348,950 | 10/1967 | Weiss | 426/439 X |
| 3,502,479 | 3/1970 | Singer et al. | 426/550 X |
| 3,545,979 | 3/1968 | Ghaffori . | |
| 3,647,474 | 3/1972 | Dame et al. | 426/550 X |
| 3,653,916 | 4/1972 | Straughen et al. . | |
| 3,843,827 | 10/1974 | Lee et al. | 426/293 |
| 4,068,009 | 1/1978 | Rispolt et al. | 426/296 X |
| 4,251,551 | 2/1981 | VanHulle et al. | 426/293 X |
| 4,285,979 | 8/1981 | Izzi | 426/94 |
| 4,499,113 | 2/1985 | Mochizuki et al. | 426/293 X |
| 4,675,197 | 6/1987 | Banner et al. | 426/296 X |
| 4,749,583 | 6/1988 | Branch | 426/549 |
| 4,764,386 | 8/1988 | Bernacchi et al. | 426/293 |
| 4,808,423 | 2/1989 | Hansson | 426/273 |
| 4,834,996 | 5/1989 | Fazzolare et al. | 426/550 X |
| 4,910,031 | 3/1990 | Budd et al. | 426/96 |

*Primary Examiner*—Arthur L. Corbin
*Attorney, Agent, or Firm*—Laff, Whitesel, Conte & Saret

[57] ABSTRACT

A snack product and its method of manufacture including obtaining an expanded farinaceous material initially containing up to 20% by weight moisture, battering and breading the material, and then baking and frying it.

23 Claims, No Drawings

PROCESS FOR MAKING COATED EXPANDED SNACK PRODUCT

This is a continuation of co-pending application Ser. No. 07/308,146 filed on Feb. 8, 1989, now abandoned.

BACKGROUND OF THE INVENTION

This invention relates generally to snack products. More particularly, this invention relates to a method for preparing batter coated and breaded edible base material containing up to 20% by weight moisture which is baked and then fried to produce a unique new generation of snack product and to the new snack product itself.

Since their inception, snack foods have been evolving into ever changing products. From the simplest of snacks like potato chips and popcorn, through the more complicated extruded snack products, current snack foods can be categorized into three generations of development.

First Generation Snacks

The first generation snacks, which are the most traditional of snack items, are made from a single whole ingredient. First generation snacks are usually produced by a means other than extrusion. Typical of these snacks are potato chips, popcorn and nuts.

Second Generation Snacks

Technological developments have resulted in the creation of second generation snacks. These differ from first generation snacks in that they are made from one or more base ingredients not in their whole form. Second generation snack foods may be expanded or unexpanded. In some cases, a frying and/or a baking step is used to give the product its final textural qualities. Classic examples of second generation snacks include corn curls (expanded), tortilla chips (unexpanded) and corn chips (unexpanded).

Extrusion equipment can be used to produce a second generation snack in the form of an expanded farinaceous material. In the extrusion process, the products are expanded, shaped and sized at the extrusion die. No further expansion is required.

Seasoning of second generation snacks can be achieved through topical dry or oil slurry application.

Third Generation Snacks

Combining cereal products and starches into mixtures which are subjected to successive processing stages gives rise to third generation snacks. Typical of this category are pellets or half-products which require two steps to define the shape of the finished product. The extrusion process differs from that used in producing a second generation snack in that a primary extruder gelatinizes the ingredients creating certain restrictions on the dough mass. A secondary extruder can be used to densify, shape and cool the dough through a final die.

This dense material, which contains from 20-30% moisture by weight, is then processed through a dryer at a selected time and temperature to achieve a final 10-12% moisture level. The resulting pellets can be packaged with ultimate expansion to be carried out by a processor or they can be stored in a climate controlled area for 24 hours, further expanded by hot air or hot oil, and seasoned.

Third generation snacks combine shapes and ingredients to yield the widest variety of currently available snack foods.

Fourth Generation Snacks

In the unique fourth generation snack of this invention, a second or third generation item is coated and further processed to achieve a new product with unique texture, taste and appearance.

SUMMARY OF THE INVENTION

It is an object of the present invention to provide a new expanded snack product with unique texture, flavor and appearance characteristics.

It is another object of the present invention to provide an expanded snack product which has been battered, breaded, baked and fried.

It is a still further object of the present invention to provide a snack product with reduced oil content.

It is yet another object of the present invention to provide a new generation of snack food which represents an important improvement beyond second and third generation snack foods.

Other objects and advantages of the invention will appear hereinafter.

The present invention is directed to a method of preparing coated expanded snack products from battered, breaded, baked and fried base material. It is also directed to the battered, breaded, baked and fried end product.

The base materials useful in the practice of the invention include any expanded edible base material initially containing up to 20% by weight moisture which maintains its integrity on immersion in the liquid precoat mixture used in the method of the invention. In a more preferred embodiment, the initial moisture level will be less than about 10% by weight and in a most preferred embodiment, it initially will be less than about 5% by weight.

One group of particularly useful base materials include any expanded farinaceous second or third generation snack products which maintain their integrity on immersion in the liquid precoat mixture used in the method of the invention. Preferred second generation products include expanded corn, rice, potato, oat and wheat, or combinations of two or more thereof, with corn, rice, potato and wheat being preferred. Preferred third generation products include pellets and half-products that are further expanded corn, rice, potato, oat and wheat, or combinations of two or more thereof, with corn, rice, potato and wheat being preferred. Among the noted expanded second and third generation farinaceous materials, expanded corn is most preferred, because of its wide availability and its economics relative to other farinaceous materials.

Another particularly useful base material is pork skins, which is a third generation snack food composed primarily of protein. This product is not extruded; it exists initially as a shelf stable half product (pork rind pellet) produced by rendering fresh or frozen pieces of pork skin. Rendering expels the moisture from the pork skin, making this a base material with no more than 20% by weight moisture. The resulting pork rind pellets are then popped by frying in either pork fat or vegetable oil to produce an expanded pork skin which may be used as a base in the practice of this invention.

It is most important in the practice of the invention to control the moisture in each stage of processing. During frying, oil is exchanged with water, and therefore excess water leads to an undesirably oily product. Residual moisture also tends to yield a tougher and more chewy product. Accordingly, as already noted, the moisture content of the base should not exceed about 20% by weight, preferably should not exceed about 10% by weight and most preferred should not exceed about 5% by weight.

The liquid precoat mixture comprises a dry batter and water mixture. In order to control moisture in the product (which ultimately controls oil content and texture, as discussed earlier) it was found that the hydration ratio of the precoat mixture should not exceed 3:1 by weight water to dry mix. In terms of a Zahn cup measure at 8.9° C. (matches applicable ASTM formula in D4212), the broadest useful viscosity range is about 10–22 seconds, a preferred range is 12–20 seconds, and the most preferred range is 16–18 seconds.

The dry ingredients of the batter may be any flour and/or starch. In a preferred embodiment, soft wheat flours are used. Preferred flours and starches include yellow corn flour, soft wheat flour, modified corn starch and combinations thereof. Optional additional dry ingredients include leavening, coloring and flavoring agents and hydrocolloids.

One dry batter mix which has been found to be particularly useful in the practice of the invention contains:
  Sodium bicarbonate
  Sodium aluminum phosphate
  Modified corn starch
  Yellow corn flour
  Soft wheat flour
  Coloring and flavoring agents The breading used in the invention is fine, medium or coarse, colored or uncolored, and J, homestyle or corn flake type. Most preferred among these breadings is the fine J crumb which exhibits outstanding appearance and textural qualities over the broadest range of base materials. Combinations of these crumbs as well as other crumb types may be used. It has been found, however, that if the crumbs are too fine they tend to fully seal the surface of the base, preventing optimal release of moisture, whereas if the crumbs are too large they leave much of the battered surface exposed to the hot fat upon frying, producing an undesirably oily finished product.

Although minimizing moisture content in the base material and controlling solids in the batter reduces oil content in the finished product, it was found that the desired reductions in oil content to 35 percent by weight or less could be achieved only by also introducing a baking step immediately after battering and breading the base material, and prior to frying it. This reduces oil pick-up by reducing moisture so that, in subsequent frying less moisture is available to exchange with the frying oil, as discussed earlier.

Optimum baking times will vary depending on the base material and the baking apparatus. For example, in a forced air oven, baking times and temperatures will range from about 7 minutes at about 120° C. to about 2 minutes at about 205° C.

The frying time and temperature are chosen to produce the desired color development and process economy. This may be achieved by frying the battered, breaded, and baked product at a temperature of from about 175° C. to about 205° C. for about 5 to 30 seconds. In a preferred embodiment, the product is fried at about 196° C. for about 15 seconds.

Finally, the snack product of the present invention may be flavored and colored by adding the desired flavorings, seasonings, and colorings to the batter, to the bread crumbs or to the final product, after completion of the frying step. When the flavorings, seasonings, and colorings are added to the batter, care must be taken to stay within the useful viscosity range, as discussed above.

DESCRIPTION OF PREFERRED EMBODIMENTS

The following examples are intended to illustrate the practice of the present invention. These examples are not intended to be exhaustive or limiting of the invention.

EXAMPLE 1

An expanded snack product in accordance with the present invention was prepared and tested as described below.

Precoat

The precoat was prepared from a dry batter mix comprising the following:

| | |
|---|---|
| Sodium bicarbonate (granular) | .60% |
| Sodium aluminum phosphate | .60% |
| Modified corn starch | 7.35% |
| Yellow corn flour | 45.50% |
| Soft wheat flour | 40.30% |
| Coloring agents | 3.35% |
| Fine flake salt | 2.30% |
| TOTAL | 100.00% |

Sufficient water was added to bring the viscosity of the mix to No. 2 Zahn cup equals 16 seconds at 8.9° C. The dwell time of the base in the precoat was approximately 5 seconds.

Bread Crumbs

Fine Japanese style crumbs as described in the present assignee's U.S. Pat. No. 4,423,078 were loaded into a crumb breader machine in preparation for running the experiment.

Baking and Frying Steps

The baking and frying steps were carried out in tandem. A good product rate was achieved setting the oven temperature at 204° C., the forced air oven fan speed at 4950 FPM and the oven dwell time of the product at about 2 minutes. The frying step was carried out at about 193°–196° C. for a dwell time of 15 seconds, which maximized the fry oil stability, while achieving the desired golden brown color. The frying oil used was a blend of partially hydrogenated soybean and cottonseed oils, with a melting point of approximately 40° C.

Test trials were undertaken using second generation extruded, expanded corn balls with a moisture content of less than 2% by weight and an average diameter of 2 centimeters. In one trial the corn balls were coated and then fried at 196° C. for 15 seconds. They were subsequently run through a forced air oven at 260° C. for 2 minutes, fan speed 4950 FPM. The product was black after baking because the oven actually fried the coated corn balls further due to the pickup of fat in the previous frying step.

In a more successful trial the corn balls were coated and run through the oven at 204° C. for 2 minutes, fan speed 4950 FPM. The resulting product was somewhat browned upon exiting the oven. Frying at 196° C. for 15 seconds evened out the color nicely. This product was excellent in texture, appearance and taste and had a oil content of less than 35 percent by weight. In addition, the following typical snack seasonings could be applied to the latter products: cheddar, sour cream & cheddar, and BBQ. In all cases, the resulting product would be superior to the originating generation snack products, in flavor, appearance and taste and oil content.

EXAMPLE 2

Another expanded snack product in accordance with the present invention was prepared using an extruded, expanded corn curl, coated with the same batter and bread crumbs as described above in Example 1. The oil used in this Example was 100% coconut oil, having a melting point of 22°–26° C. Dwell time of the base in the precoat was approximately 5 seconds, also as in Example 1.

A forced air oven temperature of 120° C. was used, with a dwell time of about 7 minutes. The frying step was carried out at about 193° to 196° C., for a dwell time of about 20 seconds. The resulting product was excellent in texture, appearance and taste.

EXAMPLE 3

Another expanded snack product in accordance with the present invention was prepared using expanded pork skins containing about 2% by weight moisture. The procedures and parameters of Example 2 were followed to produce an end product which included substantial snack product that was excellent in texture, appearance and taste. If oven fan speed, oven dwell time and/or oven temperature were increased, the yield of excellent snack product would be improved.

EXAMPLE 4

If the experiment of Example 2 were carried out using the materials and parameters of Example 2, but deleting the baking step, it would be found that the resulting product would contain at least about 40% by weight oil, which is considered to be undesirable and would be unacceptable to most consumers. An oil content of less than 35% by weight would be acceptable to most consumers.

While the present invention is described above in connection with preferred or illustrative embodiments, these embodiments are not intended to be exhaustive or limiting of the invention. Rather, the invention is intended to cover all alternatives, modifications, and equivalents included within its spirit and scope, as defined by the appended claims.

What we claim is;

1. A method of making a coated expanded snack product comprising:
    obtaining an expanded farinaceous material containing up to about 20% by weight moisture which maintains its integrity on immersion in a liquid precoat mixture;
    battering the expanded farinaceous material in the liquid precoat mixture;
    applying a breading to the battered expanded farinaceous material;
    baking the batter and breaded expanded farinaceous material; and
    frying the battered, breaded and baked expanded farinaceous material.

2. The method of claim 1 in which the expanded farinaceous material is chosen from the group consisting of expanded corn, rice, potato, oats, wheat or combinations of two or more thereof, and expanded half products of corn, rice, potato, oat, wheat and combinations of two or more thereof.

3. The method of claim 2 in which the farinaceous material is expanded corn.

4. The method of claim 2 in which the farinaceous material is pellets or half products of corn.

5. The method of claim 1 in which the expanded farinaceous material has a moisture content of up to about 10% by weight.

6. The method of claim 1 in which the expanded farinaceous material has a moisture content of up to about 5% by weight.

7. The method of claim 1 in which the liquid precoat mixture comprises a mixture of water and a dry batter ingredient, the dry batter ingredient comprising flour.

8. The method of claim 1 in which the liquid precoat mixture comprises a mixture of water and a dry batter ingredient, the dry batter ingredient comprising soft wheat flour.

9. The method of claim 8 in which the liquid precoat mixture comprises a mixture of water and dry batter ingredients, the dry batter ingredients comprising a mixture of yellow corn flour, soft wheat flour and modified corn starch.

10. The method of claim 1 in which the liquid precoat mixture comprises a mixture of water and dry batter ingredients, the dry batter ingredients comprising flour and starch.

11. The method of claim 1 in which the liquid precoat mixture comprises a mixture of water and dry batter ingredients, the dry batter ingredients comprising, in percentages by weight:

| | |
|---|---|
| Sodium bicarbonate | .60% |
| Sodium aluminum phosphate | .60% |
| Modified corn starch | 7.35% |
| Yellow corn flour | 45.50% |
| Soft wheat flour | 40.30% |
| Coloring agents | 3.35% |
| Fine flake salt | 2.30%. |

12. The method of claim 1 in which the liquid, precoat mixture comprises a mixture of water and dry batter ingredients, the dry ingredients being present in a weight ratio of up to 3:1 by weight water to dry ingredients.

13. The method of claim 1 in which the liquid precoat mixture has a viscosity yielding a No. 2 Zahn cup measure of 10–22 seconds at 8.9° C.

14. The method of claim 1 in which the liquid precoat mixture has a viscosity yielding a No. 2 Zahn cup measure of 12–20 seconds at 8.9° C.

15. The method of claim 1 in which the liquid precoat mixture has a viscosity yielding a No. 2 Zahn cup measure of 16–18 seconds at 8.9° C.

16. The method of claim 1 in which the breading is chosen from the group consisting of J, homestyle, and cornflake type breading.

17. The method of claim 1 in which the breading is fine J crumb.

18. The method of claim 1, in which flavorings, seasonings and colorings are added to the final product, after completion of the frying step.

19. The method of claim 1 in which the battered and breaded base material is baked in a forced air oven for about 7 minutes at 120° C. to about 2 minutes at about 205° C.

20. The method of claim 1 in which the battered, breaded and baked base material is fried at a temperature of about 175° C. to about 205° C. for about 5–30 seconds.

21. The method of claim 20 in which the battered, breaded and baked base material is fried at about 196° C. for about 15 seconds.

22. The method of claim 1 in which flavorings, seasonings, and colorings are added to the liquid precoat mixture.

23. The method of claim 1 in which flavorings, seasonings and colorings are added to the breading.

* * * * *